(12) United States Patent
Takeda et al.

(10) Patent No.: US 6,519,422 B1
(45) Date of Patent: Feb. 11, 2003

(54) IMAGE FORMING APPARATUS FEATURING A TEMPERATURE-SENSITIVE APPARATUS IDENTIFYING FEATURE

(75) Inventors: Atsushi Takeda, Mishima (JP); Fumiteru Gomi, Shizuoka-ken (JP); Kouichi Hashimoto, Numazu (JP); Yoshiyuki Komiya, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/568,514

(22) Filed: May 11, 2000

(30) Foreign Application Priority Data

May 13, 1999 (JP) .......................................... 11-133336
Apr. 28, 2000 (JP) ....................................... 2000-130423

(51) Int. Cl.$^7$ .............................................. G03G 15/00
(52) U.S. Cl. ...................................... 399/12; 399/366
(58) Field of Search .......................... 399/12, 159, 322, 399/366, 94, 97, 150

(56) References Cited

U.S. PATENT DOCUMENTS

| 4,941,021 | A | * | 7/1990 | Uchida et al. ............... 399/322 |
| 5,621,503 | A | * | 4/1997 | Komaki et al. .............. 399/366 |
| 5,701,550 | A | * | 12/1997 | Lofftus et al. ............. 399/94 X |
| 5,809,379 | A | * | 9/1998 | Yano et al. .................. 399/159 |
| 5,822,660 | A | * | 10/1998 | Wen ........................ 399/366 X |
| 6,023,594 | A | * | 2/2000 | Okiyama et al. .............. 399/12 |
| 6,029,018 | A | * | 2/2000 | Rogers et al. ................ 399/12 |
| 6,341,207 | B1 | * | 1/2002 | Sasaki et al. ........... 399/150 X |

* cited by examiner

Primary Examiner—Fred L Braun
(74) Attorney, Agent, or Firm—Fitzpatrick, Cella, Harper & Scinto

(57) ABSTRACT

An image forming apparatus includes a plurality of image bearing members and a plurality of image forming devices for forming toner images on the respective image bearing members, wherein the toner images formed on the respective image bearing members by the respective image forming devices are successively transferred to a transfer medium, and wherein a toner image for identifying the apparatus is formed on the image bearing member having the highest temperature among the plurality of image bearing members.

22 Claims, 10 Drawing Sheets

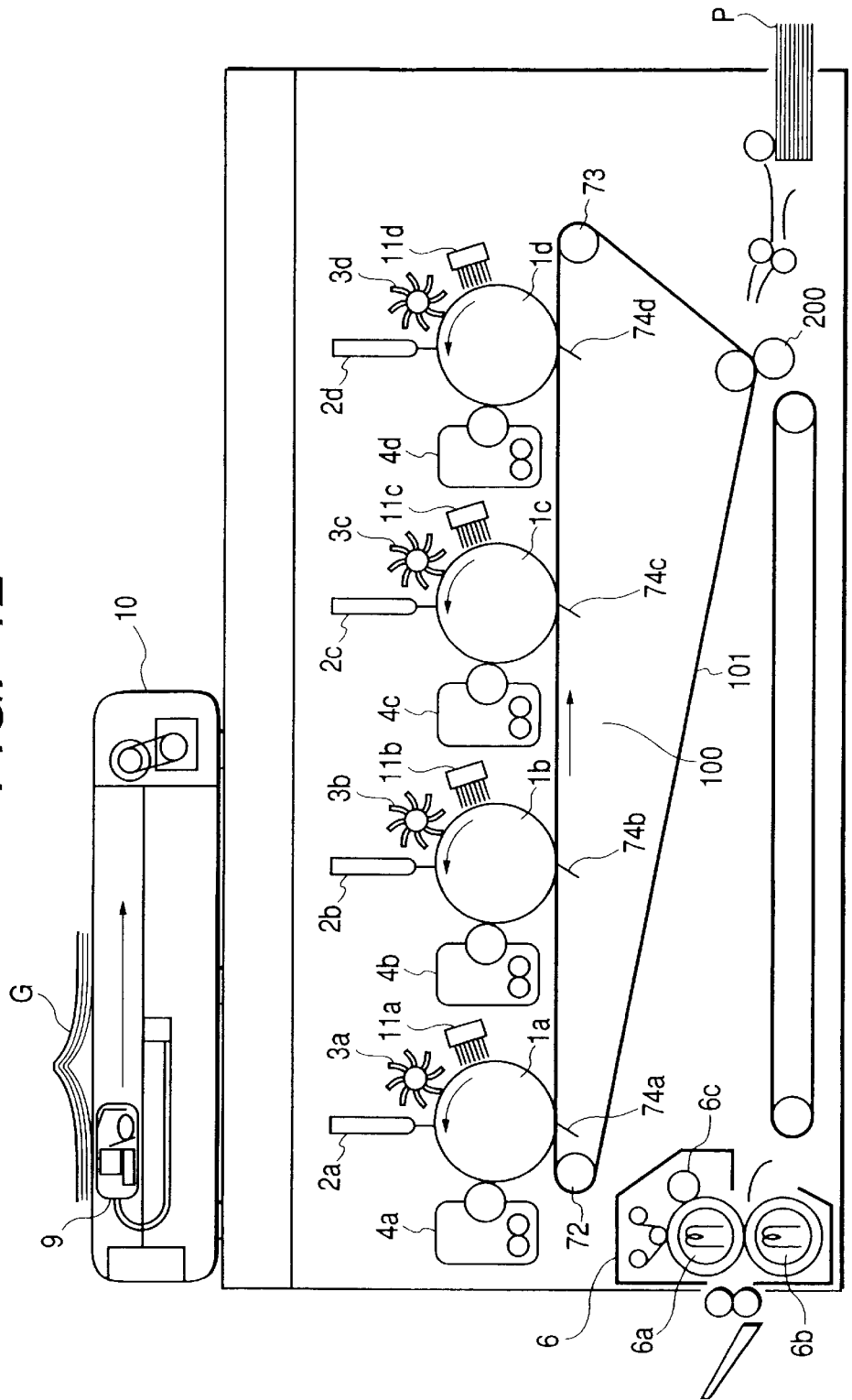

IMAGE FORMING APPARATUS FEATURING A TEMPERATURE-SENSITIVE APPARATUS IDENTIFYING FEATURE

BACKGROUND OF THE INVENTION

1. Field of the Invention

The present invention relates to an image forming apparatus which uses an electrophotographic method, and to image forming apparatuses such as a copying machine, a printer and facsimile.

2. Related Background Art

A large number of image forming apparatuses using an electrophotographic method or an electrostatic recording method have heretofore been proposed. The schematic constitution and operation of the image forming apparatus will be described with reference to FIG. 13.

In the image forming apparatus shown in FIG. 13, when a copy start signal is inputted, a photosensitive drum 101 of a printer section is charged by a charger 103 to provide a predetermined potential. On the other hand, when an original placed on an original glass stand (not shown) of a reader section is irradiated by a unit integrally constituted of an original illuminating lamp, a short focus lens array and a CCD sensor and scanned, illuminating scan light reflected by an original surface is imaged by the short focus lens array and is incident upon the CCD sensor.

The CCD sensor is constituted of a light receiving section, a transmitting section and an output section, a light signal is converted to a charge signal in the CCD light receiving section, and successively transmitted to the output section in synchronism with a clock pulse in the transmitting section, the charge signal is converted to a voltage signal in the output section, and the voltage signal is amplified, lowered in impedance and outputted. An analog signal obtained in this manner is subjected to a known image processing, converted to a digital signal and sent to the printer section.

In the printer section, by scanning a laser beam L of a solid laser element turned on to emit light and off upon receiving the image signal by a polygon mirror rotating at a high speed, an electrostatic latent image corresponding to an original image is formed on the surface of the photosensitive drum 101. Subsequently, the electrostatic latent image on the photosensitive drum 101 is developed by a developing device 104 using a two-component developer in which toner and magnetic carrier are mixed, and the latent image is visualized as a toner image.

The toner image formed in this manner on the photosensitive drum 101 is electrostatically transferred to a transfer material P by a transfer charger 105. Thereafter, the transfer material P is electrostatically separated from the photosensitive drum 101 by a separation charger 106, and conveyed to a fixing device (not shown), and then the toner image is thermally fixed, and outputted as a printed image. For the photosensitive drum 101 from which the toner image is transferred, after adhering contaminants such as a transfer residual toner adhering to the surface are removed by a cleaner 107, the drum is repeatedly used for the next image formation.

In full-color image formation, from the viewpoint of high-speed printing, a so-called tandem type in which a plurality of sets of the photosensitive drum 101 and surrounding devices such as the charger 103 are arranged has started to be employed. As a transfer method, there has started to be used a direct transfer method which comprises: bearing the transfer material on a transfer belt formed of a resin belt or a rubber belt; conveying the transfer material to a plurality of photosensitive drums; and successively transferring toner images on the photosensitive drums in synchronism with the transfer material, or an intermediate transfer method which comprises: successively transferring the toner images on a plurality of photosensitive drums onto an intermediate transfer belt in synchronism with the intermediate transfer belt; and transferring the toner images to the transfer material from the belt.

Additionally, in recent years, as charging means for the photosensitive drum, because of advantages such as low ozone and low power, a contact charging device has been placed in practical use which brings a charging member with a voltage applied thereto in contact with the photosensitive drum 101 and charges the drum, and in the device, a magnetic brush is preferably used as the contact charging member in terms of the safe contact with the photosensitive drum.

In the magnetic brush type contact charging device, conductive magnetic particles are magnetically attracted and borne onto a magnet or a sleeve containing the magnet, the magnetic particles are stopped or rotated and brought in contact with the photosensitive drum, and the photosensitive drum is charged by applying a voltage to the contact charging member.

As the contact charging member, a conductive fur brush formed of conductive fibers in a brush shape, or a conductive rubber roller formed of a conductive rubber in a roller shape is also preferably used.

Particularly, when the contact charging member is used with a photosensitive drum including a surface layer in which conductive fine particles are dispersed on an ordinary organic photoconductor, or a photosensitive drum using an amorphous silicon photoconductor, the photosensitive drum surface is charged by an injection charging method, and it is possible to obtain a charging potential substantially equal to that of the direct-current component of a charging bias applied to the contact charging member on the photosensitive drum surface.

In the injection charging method, since an electric discharge phenomenon is not utilized as in a corona charging method, the complete ozone-less and lower power consumption type charging of the photosensitive drum is enabled, and the method has been noted.

In the image forming apparatus which uses the contact charging method, however, since the resistivity of the surface layer of the photosensitive drum lowers particularly under high humidity, the charge after the exposure is diffused, and a charge pattern is unsharpened. For example, when the image pattern requiring a high resolution is formed, the reproducibility of the pattern is deteriorated in some cases.

On the other hand, in the full-color copying machine, the prevention of forgery of images of paper money, and the like, and the tracking of output images needs to be realized. The tracking herein refers to the identifying of the copying machine type, machine type main body manufacture number, and the like from the output image. To realize this, as shown in FIG. 14, for example, a yellow toner is used to write a high resolution pattern for tracking into the image in an inconspicuous manner to such an extent that the essential original image is not influenced. Therefore, when the reproducibility of the high resolution pattern is deteriorated, the tracking of the output image to identify the apparatus having outputted the image cannot be performed.

As a factor of the above-described unsharpened charge pattern, when the photosensitive drum is contact-charged, a slight amount of discharge products (NOx) adhere to the photosensitive drum surface, the discharge products provide a low resistance ($HNO_3$) under high humidity, the charge o the charge pattern formed on the photosensitive drum surface after exposure moves because of a low-resistance substance, and the charge pattern is disturbed in the phenomenon. When the fillers contained in the paper as the transfer material, such as talc, kaolin, and calcium carbonate adhere to the photosensitive drum surface, these deposits also provide the low resistance under the high humidity, so that the charge of the charge pattern moves and a smeared image is generated.

Moreover, in the injection charging method, the mode in which the latent image blur is generated differs, and the photosensitive drum as the charging object has a resistance layer on a surface layer. For example, when there is a charge transport layer right under the surface layer, the injected charge moves to the vicinity of a boundary surface between the surface layer and the charge transport layer, and the charge pattern of the latent image by the exposure is therefore formed in the vicinity of the boundary surface. Particularly, when the relative humidity is also high under high humidity, the volume resistivity of the surface layer is reduced, the charge is moved in the electric field caused by the charge pattern and the latent image blurs.

To avoid the problem by the resistivity drop of the surface layer under high humidity, when the resistivity of the surface layer is raised, the resistivity increases under low humidity, the injection charging becomes difficult, and the charging defect is disadvantageously caused.

To prevent the latent image blur, there is a method which comprises installing a heat source on the inner surface of the photosensitive drum and heating the photosensitive drum to lower the humidity of the photosensitive drum surface. When a plurality of photosensitive drums are arranged, however, a plurality of heat sources are also necessary, and the cost increase cannot be avoided.

SUMMARY OF THE INVENTION

An object of the present invention is to provide an image forming apparatus which can satisfactorily form a toner image for identifying the apparatus.

Other objects of the present invention will be apparent upon reading the following detailed description.

BRIEF DESCRIPTION OF THE DRAWINGS

FIG. 8 is a graph showing changes in temperature of the respective photosensitive drums from when an apparatus main body power supply is turned on.

FIG. 12 is a sectional view showing another application example of the present invention.

DETAILED DESCRIPTION OF THE PREFERRED EMBODIMENTS

Embodiments of the present invention will be described hereinafter in detail with reference to the drawings.

First Embodiment

Figure 1:
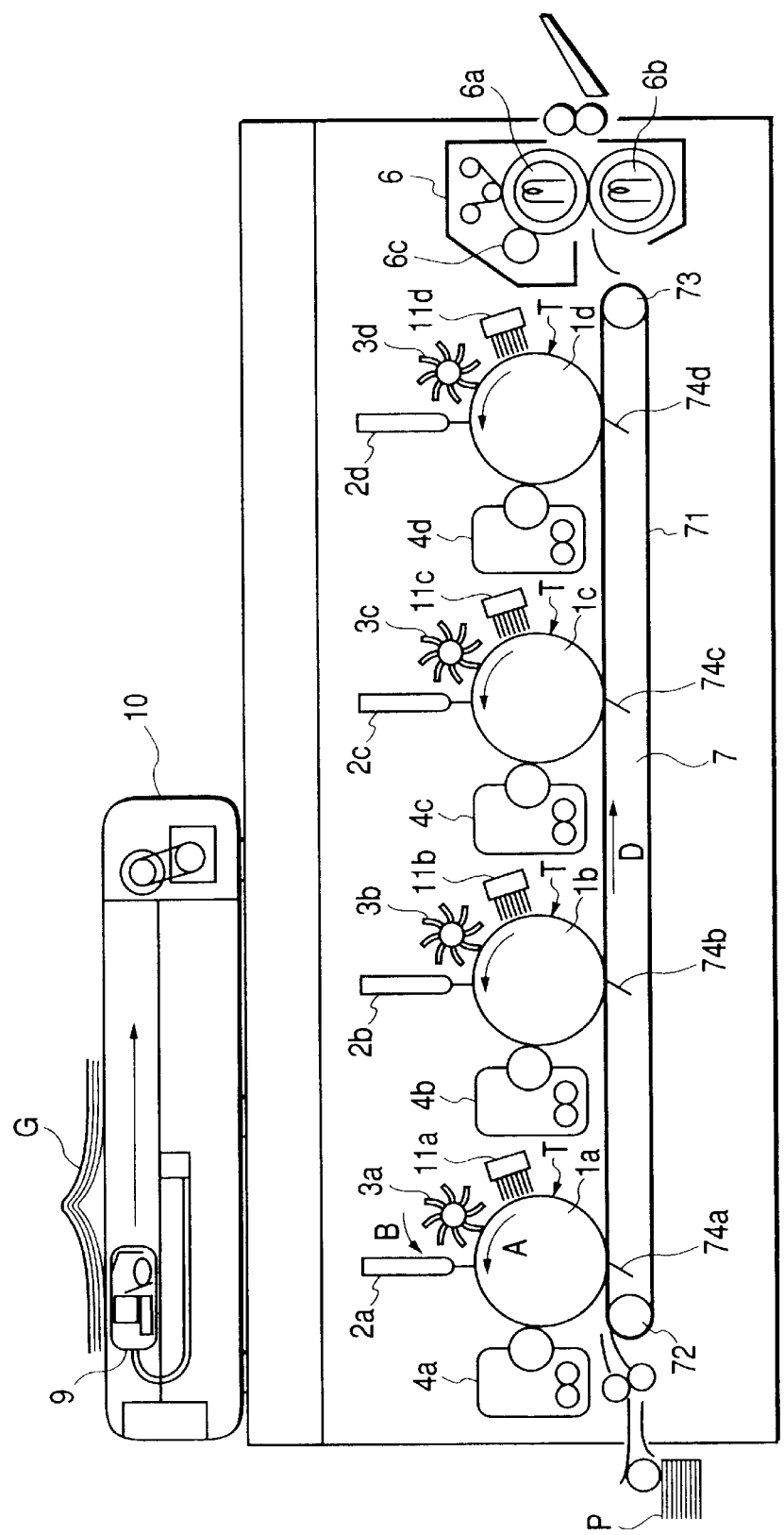
FIG. 1 is a sectional view showing an image forming apparatus in an embodiment of the present invention.

FIG. 1 is a sectional view showing an image forming apparatus in an embodiment of the present invention.

An image forming process in the image forming apparatus will be described. First, by setting a surface to be copied of an original G facing downward on an original glass stand 10, and depressing a copy button, copying is started. When a unit 9 integrally constituted of an original illuminating lamp, a short focus lens array and a CCD sensor in a reader section irradiates and scans the original, the illuminating/scanning light reflected by the original surface is imaged by the short focus lens array and is incident upon the CCD sensor.

The CCD sensor is constituted of a light receiving section, a transmitting section and an output section, a light signal is converted to a charge signal in the CCD light receiving section, and successively transmitted to the output section in synchronism with a clock pulse in the transmitting section, the charge signal is converted to a voltage signal in the output section, and the voltage signal is amplified, lowered in impedance and outputted. An analog signal obtained in this manner is subjected to a known image processing, converted to a digital signal (image signal) and sent to a printer section.

In the printer section, upon receiving the image signal, an electrostatic latent image is formed as follows. A photosensitive drum 1 (1a, 1b, 1c, 1d) is rotated/driven about a center support axis at a predetermined peripheral speed in a direction of arrow A, and uniformly charged in a negative polarity by a magnetic brush charger 3 (3a, 3b, 3c, 3d) rotated/driven in a direction of arrow B in a rotation process, and the electrostatic latent image corresponding to the original image is formed on the uniformly charged surface by an LED exposure device 2 (2a, 2b, 2c, 2d ) turned on to emit light or off in response to the image signal. Furthermore, the present embodiment is constituted to form an electrostatic latent image for tracking by the LED so that the image overlaps with the electrostatic latent image corresponding to the original image.

In the present embodiment, the used exposure system had a resolution of 600 dpi, a wavelength of 680 $\mu$m, and a static spot diameter of about 50 $\mu$m on the photosensitive drum (value at which the light amount becomes $1/e^2$ of a peak value light amount in Gaussian distribution approximation).

In the present invention, an ordinary organic photoconductor, and the like can be used in the photosensitive drum 1, but the surface layer of a material with a resistance of $10^9$ to $10^{14}$ Ωcm is preferably disposed on the organic photoconductor, and an amorphous silicon photoconductor is also preferable. When such photosensitive drum is used, the injection charging can be realized, the prevention of ozone generation and the reduction of power consumption are achieved, and the enhancement of charging properties is enabled.

Figure 2:
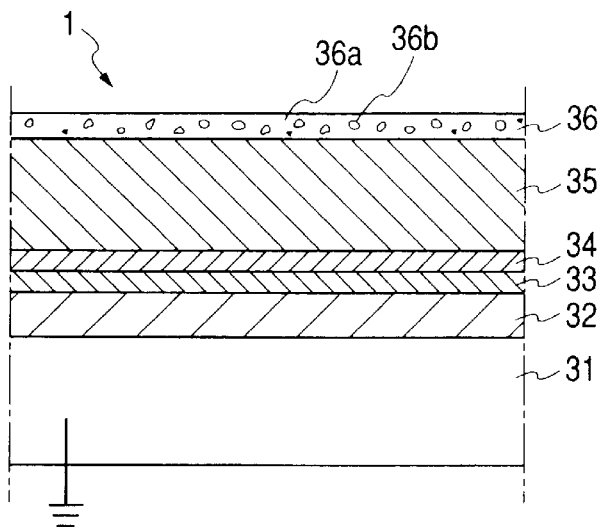
FIG. 2 is a sectional view showing a photosensitive layer of a photosensitive drum installed in the image forming apparatus of FIG. 1.

In the present embodiment, use is made of a photosensitive drum of a negatively charged organic photoconductor (OPC) in which a photosensitive layer obtained by laminating first to fifth layers from below is disposed on a drum substrate of aluminum with a diameter of 30 mm. This constitution will be described with reference to FIG. 2.

A first layer is an undercoat layer 32, and is formed of a 20 μm thick conductive layer which is disposed to smoothen the defective surface of an aluminum drum substrate 31. A second layer is a positive charge blocking layer 33, plays a role of preventing the positive charge injected from the drum substrate from canceling the negative charge on the photosensitive drum surface, and is constituted of a 1 μm thick medium-resistance layer which is formed of amylane resin and methoxymethyl nylon and whose resistance is adjusted to provide a volume resistivity of about $10^6$ Ωcm.

A third layer is a charge generation layer 34, is about 0.3 μm thick in which a diazo-based pigment is dispersed in resin, and generates a pair of positive and negative charges by the exposure. A fourth layer is a charge transport layer 35, and is a p-type semiconductor layer formed by dispersing hydrazone in polycarbonate resin. Therefore, the negative charge given to the photosensitive drum cannot move in this layer, and only the positive charge generated in the charge generation layer can be transported to the photosensitive drum surface.

A fifth layer is a charge injection layer 36, and is a coating layer in which $SnO_2$ ultrafine particles 36b are dispersed in an insulating resin binder 36a. Specifically, the coating layer is formed by doping antimony as an insulating filler provided with light transmission properties, and dispersing low-resistant (conductive) $SnO_2$ particles with a particle diameter of about 0.03 μm in insulating resin by about 70 wt %. The charge injection layer was formed by preparing a coating liquid of the above-described material, and applying the liquid in a thickness of about 4 μm by a dipping coating method, spray coating method, roll coating method, beam coating method, and other appropriate coating methods.

Figure 3:
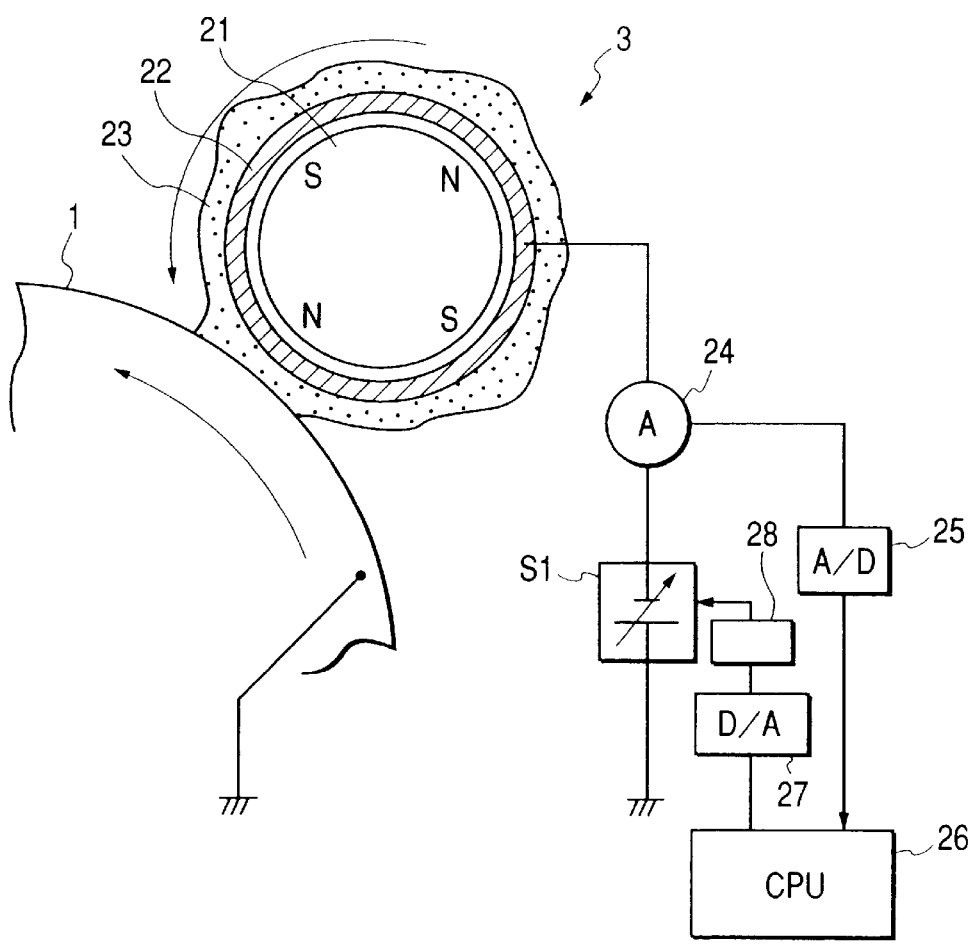
FIG. 3 is a sectional view showing a magnetic brush charger installed in the image forming apparatus of FIG. 1.

For the magnetic brush charger 3 used in the present embodiment, as shown in FIG. 3, magnetic particles 23 are borne on a rotatable nonmagnetic sleeve 22 with an outer diameter of 16 mm by the magnetic force of a roller-shaped magnet 21 disposed inside in a nonrotating manner, and are formed into a brush shape, so that the brush-shaped magnetic particles 23 contact the surface of the photosensitive drum 1. Moreover, the magnetic brush charger is used by applying a charging voltage to the sleeve 22, and bearing the magnetic particles 23 in contact with the surface of the photosensitive drum 1 by the rotation of the sleeve 22, so that the surface of the photosensitive drum 1 is charged. The charge is injected to the surface of the photosensitive drum 1 from the magnetic particles 23, and the surface is charged to provide a potential corresponding to the charging voltage.

In the present embodiment, the nonmagnetic sleeve 22 was rotated in a counter direction with respect to the rotation of the photosensitive drum 1, and the rotation speed of the sleeve 22 was set to 150 mm/second while the rotation speed of the photosensitive drum 1 was 100 mm/second. As the rotation speed of the nonmagnetic sleeve 22 increases, the charging uniformity of the photosensitive drum 1 tends to be satisfactory.

The magnetic particles (magnetic carrier) 23 of the charging member preferably have an average particle diameter of 10 to 100 μm, a saturation magnetization of 20 to 250 emu/cm$^3$, and a resistance (volume resistivity) of $10^2$ to $10^{10}$ Ωcm, and the resistance is more preferably $10^6$ Ωcm or more in consideration of the presence of the insulating defects of the photosensitive drum such as a pinhole. To enhance the charging performance, the resistance is preferably as small as possible, and in the present embodiment, magnetic particles with an average particle diameter of 22 μm, saturation magnetization of 200 emu/cm$^3$, and volume resistivity of $5 \times 10^6$ Ωcm were used.

The resistivity of the magnetic particles was measured by placing 2 g of magnetic particles into a metal cell with a bottom area of 228 mm$^2$, applying a pressure of 6.6 kgf/cm$^2$, and applying a voltage of 100 V.

As the magnetic particles, a resin carrier formed by dispersing magnetite as a magnetic material in resin, and dispersing carbon black for conduction and resistance adjustment, magnetic particles obtained by subjecting a magnetite single unit surface of ferrite to oxidation and reduction to adjust the resistance, magnetic particles obtained by coating the magnetite single unit surface of ferrite with resin to adjust the resistance, and the like are used.

The nip width formed with respect to the photosensitive drum 1 by the magnetic brush of the magnetic particles 23 was adjusted to be about 6 mm. A charging bias obtained by superposing a 1000 Hz, 700 V rectangular alternating-current voltage to a direct-current voltage of −700 V was applied to the nonmagnetic sleeve 22. Thereby, it was possible to satisfactorily charge the photosensitive drum 1.

Figure 4:
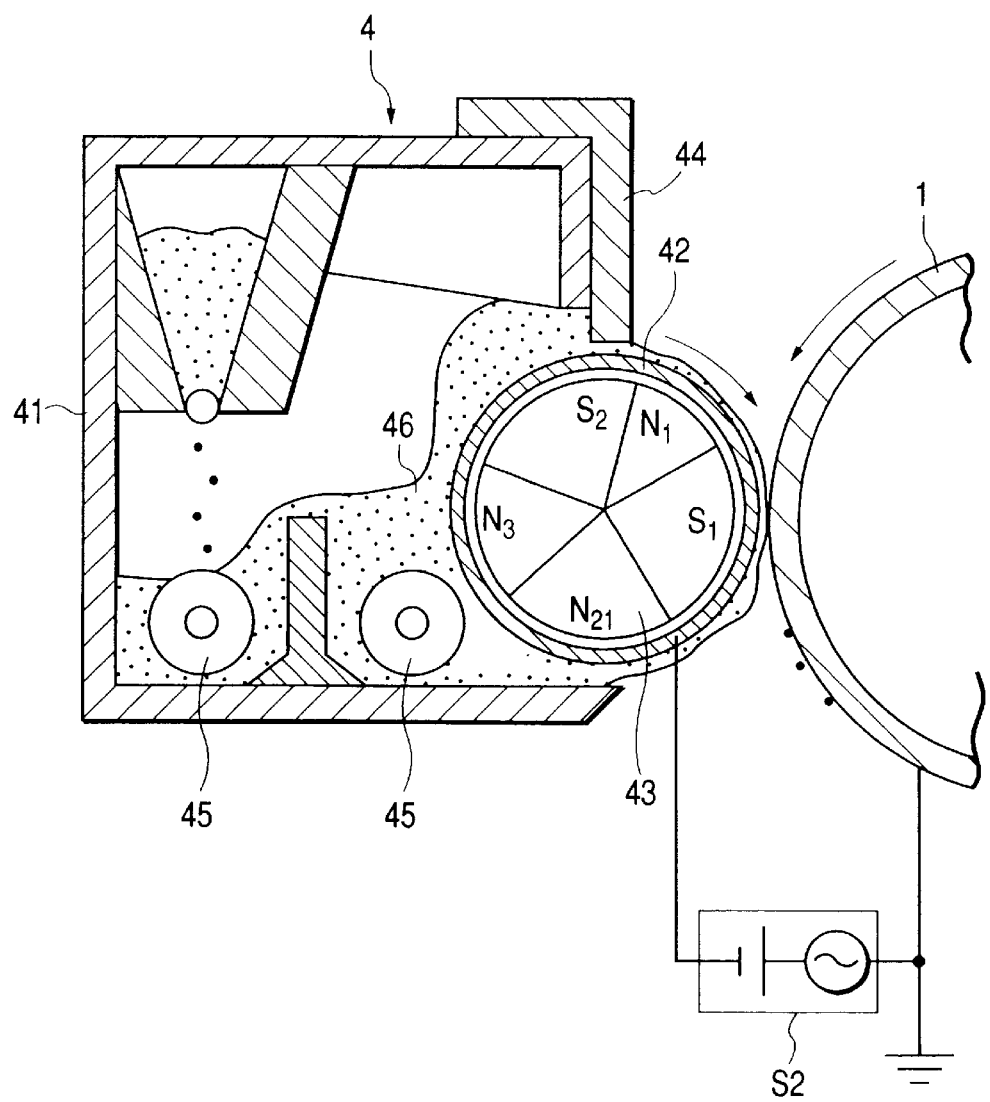
FIG. 4 is a sectional view showing a developing device installed in the image forming apparatus of FIG. 1.

A developing device 4 (4a to 4d) used in the present embodiment will be described with reference to FIG. 4. In the developing device 4 a two-component magnetic brush method is employed, and basically as shown in FIG. 4, a developer container 41 containing a two-component developer 46 with a negative toner and magnetic carrier mixed therein is provided with a developing sleeve 42 for bearing the developer and carrying the developer to a developing section disposed opposite to the photosensitive drum 1, a magnet roller 43 disposed inside the developing sleeve 42 in a nonrotating manner, agitating screws 45 for circulating the developer in the developer container 41 and supplying the developer to the developing sleeve 42, and a regulating blade 44 for regulating the developer on the developing sleeve 42 to form the developer into a thin layer.

The developing sleeve 42 is disposed so that the closest area to the photosensitive drum 1 has an interval of about 500 μm, and developing can be performed so that the developer borne on the developing sleeve 42 contacts the photosensitive drum 1. The developing sleeve 42 is rotated in a forward direction with respect to the rotational direction of the photosensitive drum 1.

In the present embodiment, for the toner of the two-component developer 46, $SiO_2$ with an average particle diameter of 50 nm and titanium oxide with an average particle diameter of 20 nm were added to a negative charged toner with an average particle diameter of 6 μm manufactured by a crushing method at each weight ratio of 0.7% and used. For the magnetic carrier of the two-component developer 46, a resin polymer carrier with a saturation magnetization of 150 emu/cm$^3$ and an average particle diameter of 35 μm was used. This is because for the conventional ferrite carrier, the charge injection occurs with respect to the photosensitive drum 1 by development, and the image fog or the light density is generated. The mixture ratio of the toner and magnetic carrier in the developer 46 was set to be 6:94 in terms of the weight ratio.

The two-component developer 46 in the developer container 41 is pumped up onto the rotating developing sleeve 42 by the magnetic force of a magnetic pole N3 of the magnet roller 43, the layer thickness is regulated by the regulating blade 44 disposed vertically to the developing sleeve 42 in the process of carrying the developer through the magnetic pole N3→S2→N1, and a thin layer of developer is formed on the developing sleeve 42. The developer formed in this thin film is carried to the developing section with the rotation of the developing sleeve 42, and stands like the ears of rice to form the magnetic brush on the surface of the developing sleeve 42 in the vicinity of the developing main pole S1 of the magnet roller 43 by the magnetic force.

The developer forming the magnetic brush contacts the surface of the photosensitive drum 1 to develop an electrostatic latent image, and the developer having finished the development is returned into the developer container 41 by the developing sleeve 42, stripped from the developing sleeve 42 by a repulsive magnetic field formed by the magnetic poles N2, N3 of the magnet roller 43, and collected into the developer container 41.

During the development, a developing bias obtained by superimposing an alternating-current voltage with a frequency Vf=2000 Hz, peak-to-peak voltage Vpp=1500 V to a direct-current voltage Vdc=−500 V was applied to the developing sleeve 42 from a development power supply (not shown).

Usually in the two-component developing method, when the alternating-current voltage is applied, the development efficiency increases, the image obtains a high grade, but conversely there is a possibility that the fog is easily generated. Therefore, usually by disposing a potential difference between the direct-current voltage of the developing bias and the surface potential of the photosensitive drum 1, the fog is prevented.

The toner image obtained by developing the latent image is transferred to the transfer material P by a transfer device 7. The transfer device 7 is constituted by extending an endless transfer belt 71 around a drive roller 72 and a driven roller 73, and the transfer belt 71 is rotated in a direction of arrow D in FIG. 1. The transfer device 7 is further provided with a transfer charging blade 74 (74a to 74d), the transfer charging blade 74 generates a pressing force from the inside of the transfer belt 71 in the direction to the photosensitive drum 1, a transfer bias is further applied to the transfer charging blade from a high-pressure power supply (transfer power supply) (not shown), the charging is performed with a polarity opposite to that of the toner from the back surface of the transfer material P on the transfer belt 71, and the toner images on the respective photosensitive drums 1 are successively superposed and transferred onto the transfer material P.

The transfer material P is supplied to the transfer belt 71 from a sheet feeding device in synchronism with the rotation of the photosensitive drum 1, and conveyed to the respective transfer sections formed by the opposite sections of the respective photosensitive drums 1 and the transfer belt 71 at an adequate timing.

In the present embodiment, a 75 μm thick polyimide resin film was used as the transfer belt 71. The material of the transfer belt 71 is not limited to polyimide resin, and resins such as polycarbonate resin, polyethylene terephthalate resin, vinylidene polyfluoride resin, polyethylene naphthalate resin, polyether ketone resin, polyether sulfon resin and polyurethane resin, and rubbers such as fluorine rubber and silicon rubber can preferably be used. The thickness is approximately in a range of 25 to 2000 μm, preferably in a range of 50 to 150 μm.

In the transfer charging blade 74, a plate having a resistance of $10^5$ to $10^7$ Ωcm, thickness of 2 mm, and length of 306 mm was used. A transfer bias of +15 μA was applied to the transfer charging blade 74 from a constant-current power supply and the transfer was performed.

The toner image on the photosensitive drum 1 is transferred to the transfer material P in this manner, but in the case of the full-color image, the toner images on the respective photosensitive drums 1 are successively superposed and transferred onto the transfer material P as described above. The transfer material P with the toner image transferred thereto is then conveyed to a fixing device 6, and the toner image is then thermally fixed, and outputted as the printed image.

On the other hand, a transfer residual toner remains on the surface of the photosensitive drum 1 after the transfer of the toner image. A simultaneous developing/cleaning method for collecting the transfer residual toner into the developing device simultaneously with the development of the latent image on the photosensitive drum has heretofore been known, but the charging polarity of the transfer residual toner is reversed by the stripping discharge during the transfer in many cases, and it is difficult to clean the polarity reversed toner simultaneously with the development.

Therefore, the transfer residual toner having reached the charging area by the magnetic brush charger 3 with the rotation of the photosensitive drum 1 is taken into the magnetic brush, and the normal charging polarity (minus polarity in the present embodiment) is returned by rubbing with the magnetic brush. In this case, if only the direct-current voltage is applied to the magnetic brush, the toner cannot sufficiently be taken into the magnetic brush. If the alternating-current voltage is applied to the magnetic brush, however, the toner can easily be taken into the magnetic brush by the vibration effect by the electric field between the photosensitive drum 1 and the charger 3, and the toner can be charged in the normal polarity by rubbing with the magnetic brush. Additionally, the taken toner is discharged to the photosensitive drum 1, and the residual toner-can be collected by the developing device 4 simultaneously with the development by the fog-removing electric field and mechanical rubbing force.

However, if the external application agents such as $SiO_2$ and titanium oxide contained in the developer adhere, and toner resin adheres to the magnetic particles of the magnetic brush and the nonmagnetic sleeve 22, the resistivity of the magnetic brush rises, thereby causing the charging trouble of the photosensitive drum 1. This becomes remarkable particularly in low humidity.

A factor for maintaining the charging properties of the photosensitive drum in this state includes the resistivity of the charge injection layer 36 which is the surface layer of the photosensitive drum 1. According to the experiment and research of the present inventors, in a durability test in which 30,000 images with A4 size and image ratio of 6% are formed in an environment with a temperature of 23° C. and relative humidity of 5%, the resistivity of the charge injection layer is preferably at least $10^{14}$ Ωcm or less, and was $5 \times 10^{12}$ Ωcm in the present embodiment.

Figure 5:
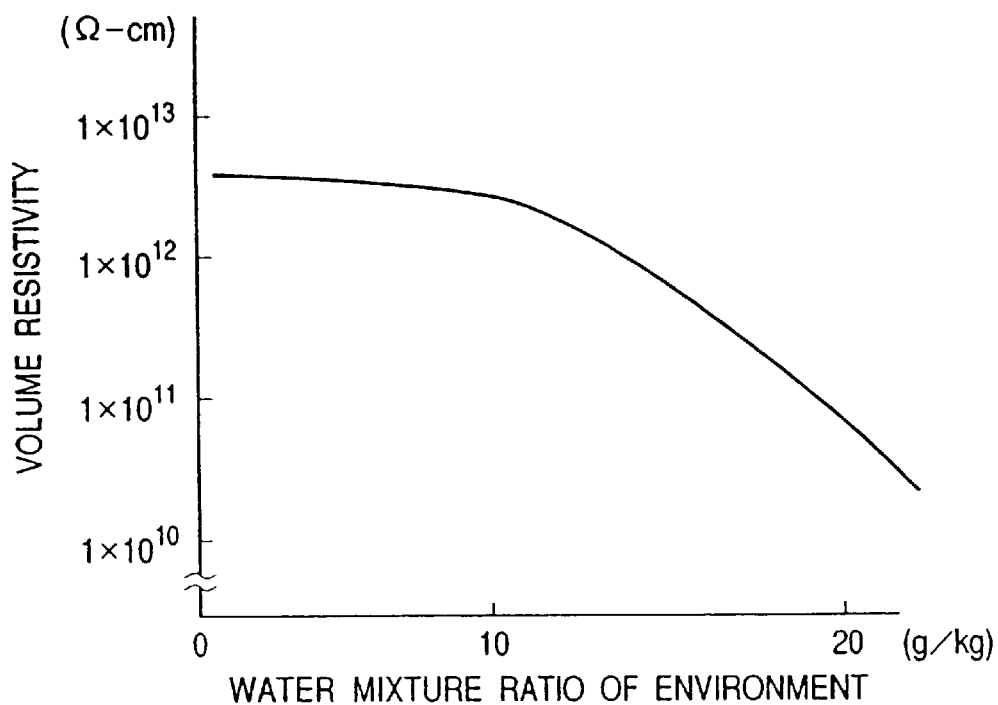
FIG. 5 is a graph showing a relation between a water mixture ratio of an environment and a volume resistivity of the surface layer of the photosensitive drum.

When the resistance adjustment is performed so that the charge injection layer of the photosensitive drum indicates $5 \times 10^{12}$ Ωcm in the environment with a temperature of 23° C. and relative humidity of 5%, the resistivity of the charge injection layer is observed to change with respect to the water mixture ratio (the weight of water in 1 kg of air) of the environment as shown in FIG. 5. The water mixture ratio is 10.5 kg/kg at 23° C., 60%, and it is found that if the mixture ratio exceeds this value, the resistivity lowers. At 30° C., 80%, the mixture ratio was 21.6 kg/kg, and the resistivity was $3 \times 10^{10}$ Ωcm.

Figure 6:
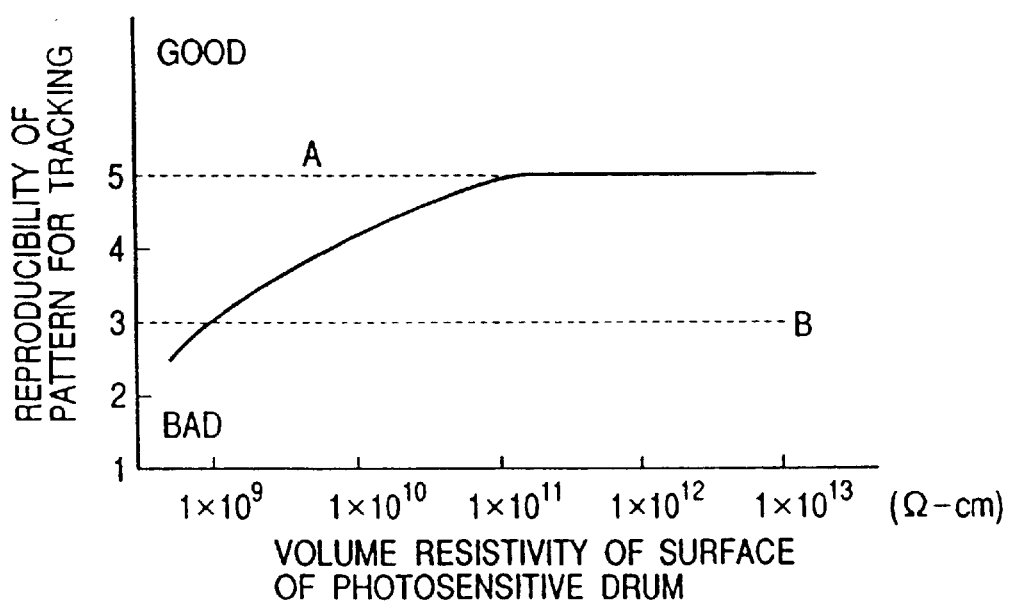
FIG. 6 is a graph showing a relation between the volume resistivity of the surface layer of the photosensitive drum and a reproducibility of a pattern for track.

FIG. 6 shows a relation between the reproducibility of the image pattern for tracking and the resistivity of the photosensitive drum surface layer for the prevention of forging of paper money, and the like. An upper broken line A indicates a threshold value at which a desirable reproducibility is obtained, and a lower broken line B indicates a limit value at which the reproducibility is obtained without any practical problem. It is seen from FIG. 6 that the resistivity of the photosensitive drum (photoconductor) surface layer needs to be at least $10^9$ Ωcm or more, and is preferably $10^{11}$ Ωcm or more.

Figure 7:
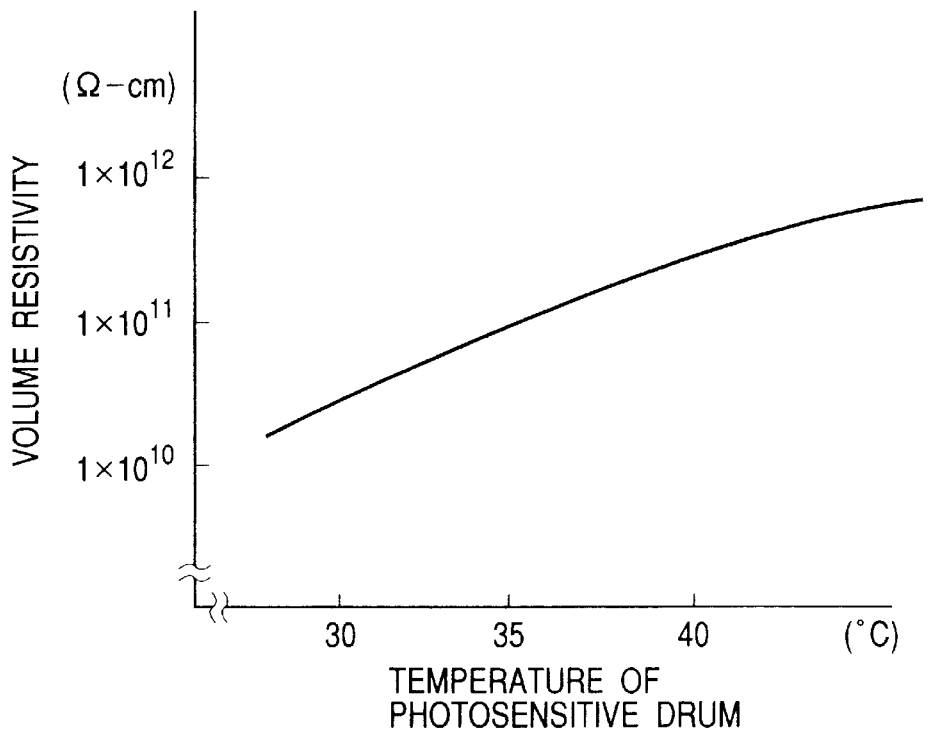
FIG. 7 is a graph showing a relation between temperature of the photosensitive drum and the volume resistivity of the surface layer of the photosensitive drum in the environment where the water mixture ratio is 21 g/kg.

FIG. 7 shows the resistivity change of the photosensitive drum surface layer with respect to the temperature change of the photosensitive drum in the environment water mixture ratio of 21.6 g/kg. The temperature of the photosensitive drum was a surface temperature of the photosensitive drum measured using a thermocouple or a thermistor. It is seen from FIG. 7 that the resistivity rises with temperature increase, and the resistivity reaches $10^{11}$ Ωcm or more at a temperature of 35° C. or more (additionally, the relative humidity if 60%). Therefore, it is seen that even in the environment with the water mixture ratio of 21.6 g/kg, if the temperature is 35° C. or more, the desirable reproducibility of the image pattern for tracking is obtained.

Figure 8:
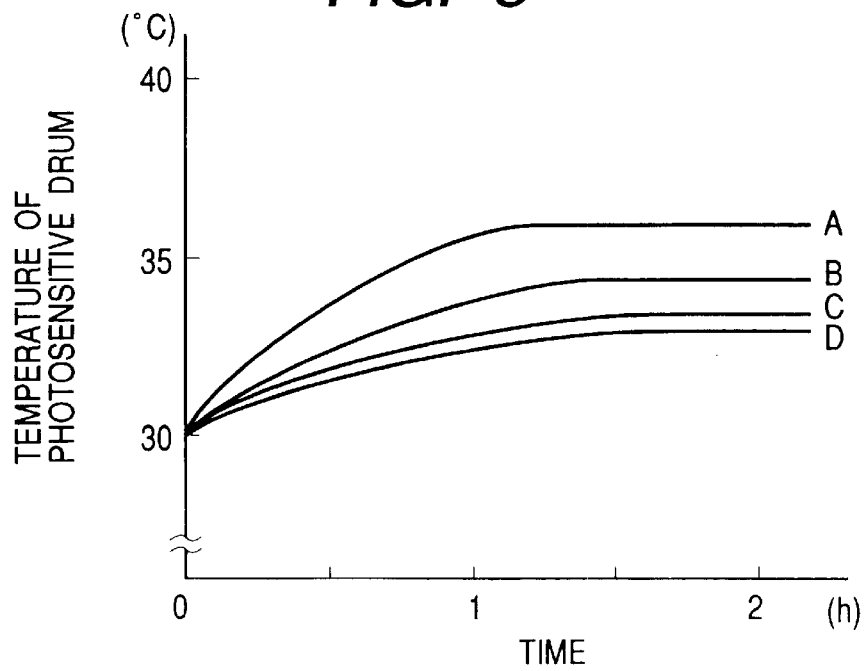

FIG. 8 shows examples of temperature changes of the respective photosensitive drum surfaces from when the power supply of the image forming apparatus main body is turned on in the environment of 30° C., 80% (water mixture ratio of 21.6 g/kg). From the photosensitive drum closest to the fixing device 6 of FIG. 1, A (photosensitive drum 1*d*), B (photosensitive drum 1*c*), C (photosensitive drum 1*b*), and D (photosensitive drum 1*a*) are shown. The fixing device is provided with 600 W heaters 6*a*, 6*b*, and temperature is adjusted at 190° C. by a thermistor 6*c*. In the standby state between a time when the preparation of the respective apparatuses is completed for image formation and a time when the copying operation is started, the fixing device heaters function as heat sources to raise the temperature in the apparatus main body. As seen from FIG. 8, the photosensitive drum A (1*d*) closest to the fixing device had the highest temperature of 36° C.

Figure 9:
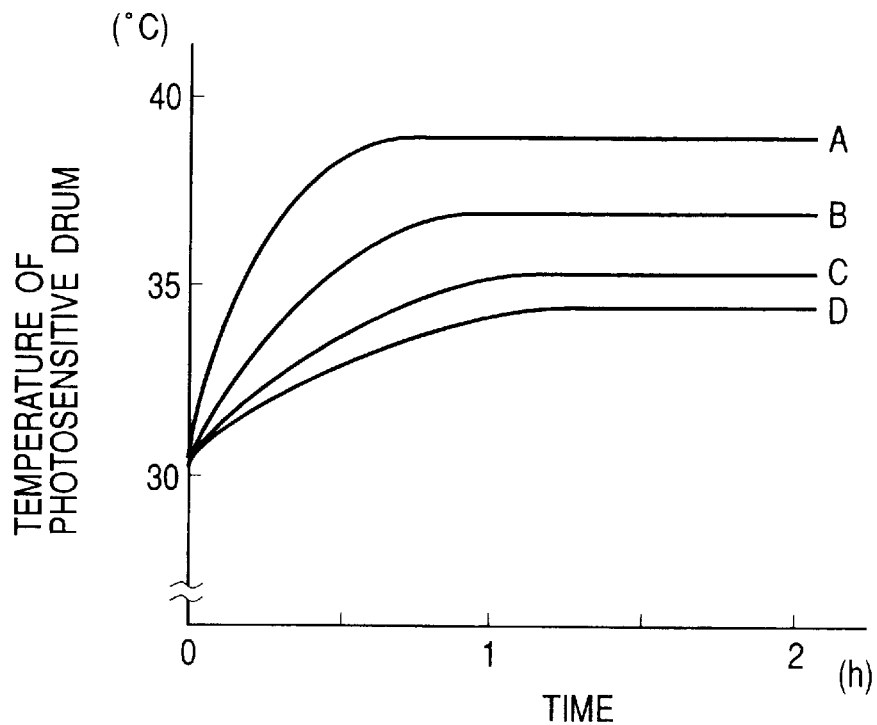
FIG. 9 is a graph showing changes in temperature of the respective photosensitive drums during continuous copying.

FIG. 9 shows the temperature changes of the respective photosensitive drums when the images are continuously formed on a plurality of transfer materials in the environment of 30° C., 8%, the abscissa indicates the time of continuous image formation, and the meanings of curve reference numerals A, B, C, D are the same as those of FIG. 8. Also in this case, the photosensitive drum closest to the fixing device had the highest temperature of 39° C.

Additionally, the temperatures of the respective photosensitive drum surfaces were measured in the positions T in FIG. 1 by the thermocouple or the thermistor. If the measurement conditions of the respective photosensitive drums are the same, the temperature measuring position is not limited to this, and may appropriately be changed.

The "photosensitive drum surface temperature" defined herein means the temperature after at least the temperature adjustment of the fixing device ends and after the preparation of the respective apparatuses for the image formation ends.

As shown in FIG. 7, in the 30° C., 80% environment with the water mixture ratio of 21 g/kg, the resistivity of the photosensitive drum surface layer is $10^{11}$ Ωcm at 35° C. or more, and it is seen that in the image forming position close to the fixing device, the conditions for obtaining the desirable reproducibility of the image pattern for tracking are provided, except immediately after the power is turned on. On the other hand, depending on the frequency of continuous use, the other photosensitive drums have the conditions in which the temperature lowers below 35° C. in some cases, and the desirable reproducibility cannot steadily be obtained.

Therefore, in the present embodiment, the image forming means such as the photosensitive drum 1*d* and charger 3*d* in the vicinity of the fixing device 6 also serve as image forming means for forming the track image pattern. Concretely, the yellow image forming means is used as the image forming means for forming the tracking image pattern. The image forming means other than the image forming means in the vicinity of the fixing device 6 are used as magenta, cyan, black image forming means.

Figure 14:
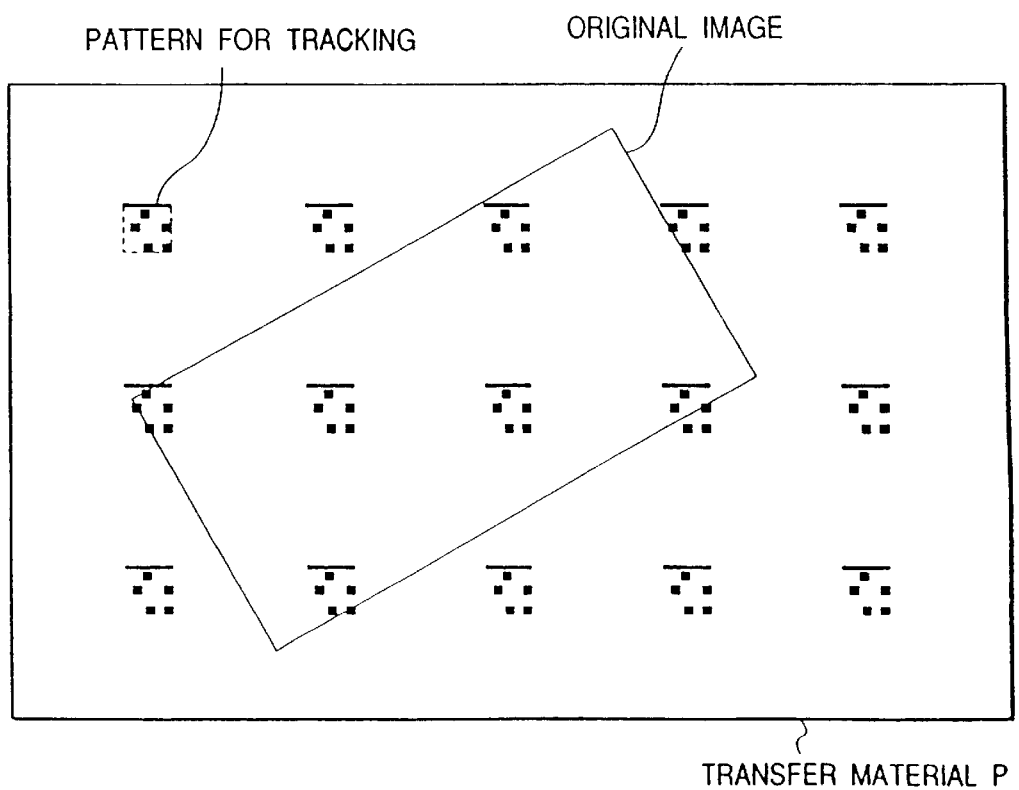
FIG. 14 shows one example of a pattern for track.

In the above-described method, by using the scanner, and the like to extract the apparatus identifying pattern (pattern for tracking) from the obtained output image (FIG. 14), the machine type, manufacture number, and the like of the image forming apparatus by which illegal copying was performed can be identified.

Additionally, when the image forming apparatus is connected to a personal computer, and the like via a network, and a print command is issued from the computer to the image forming apparatus, the apparatus identifying pattern may be provided with not only the information for identifying the image forming apparatus having emitted the output but also the information for identifying the apparatuses such as the computer.

Of course, only the information for identifying the apparatuses such as the computer may be added to the apparatus identifying pattern.

Second Embodiment

Figure 10:
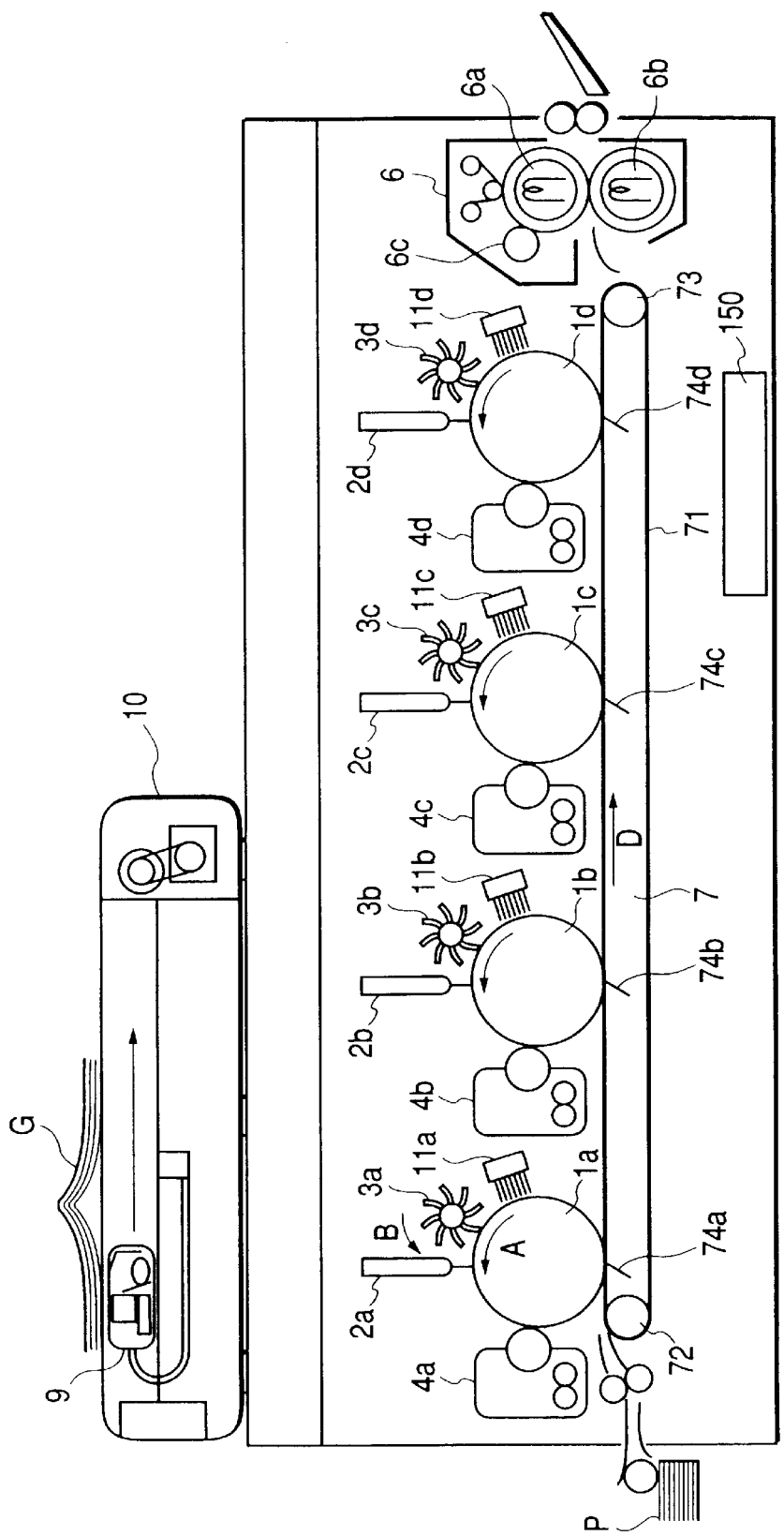
FIG. 10 is a sectional view showing an image forming apparatus in another embodiment of the present invention.
Figure 13:
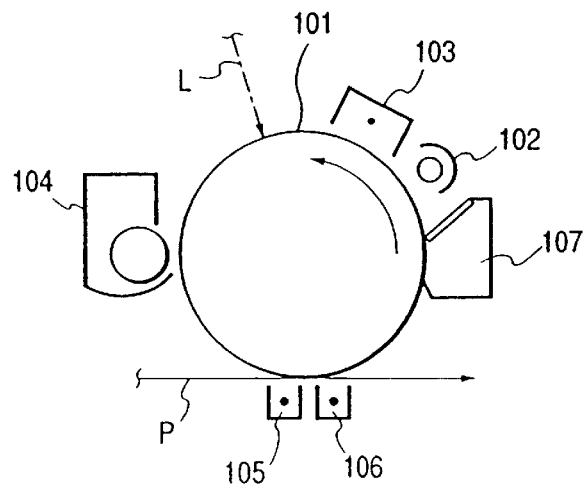
FIG. 13 is a sectional view showing a conventional image forming apparatus.
Figure 15:
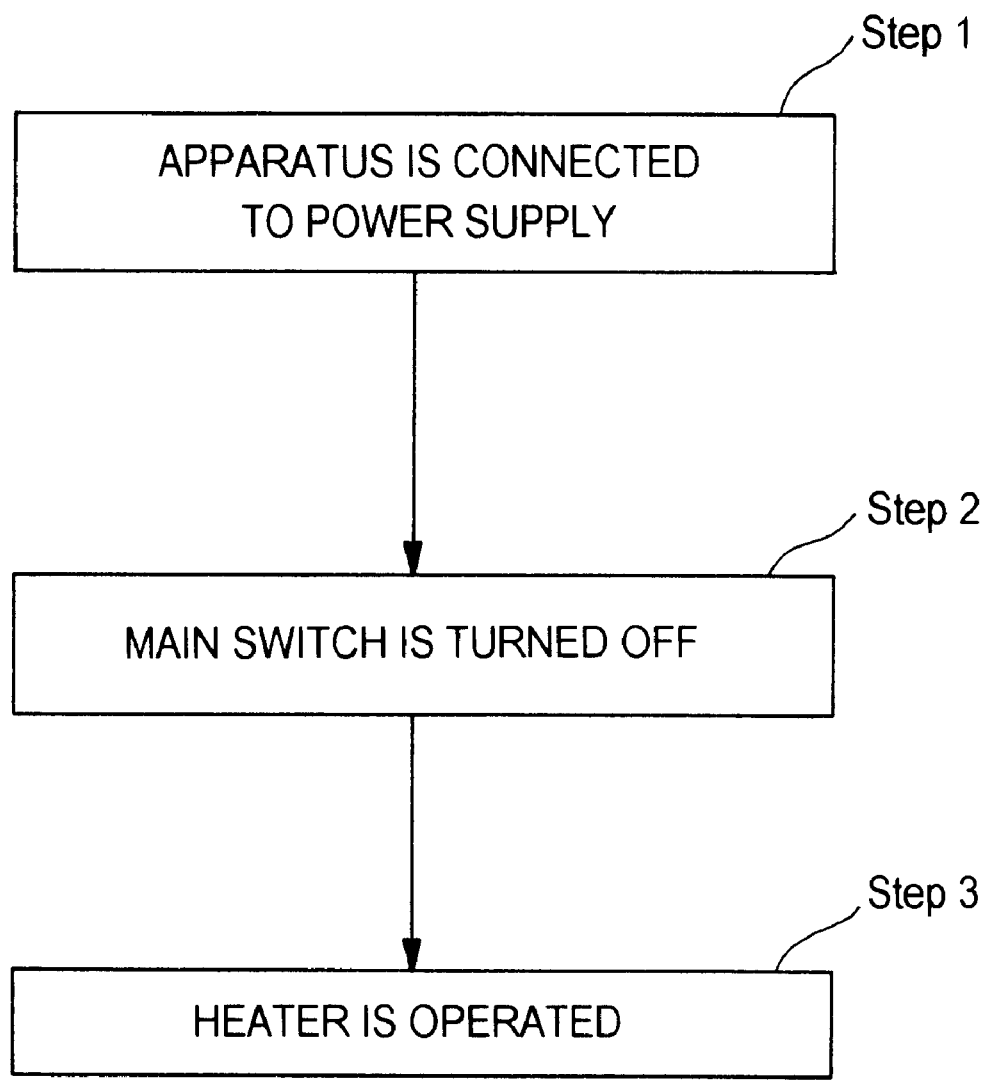
FIG. 15 is a flowchart of a second embodiment.

FIG. 10 is a sectional view showing the image forming apparatus in another embodiment of the present invention. In the present image forming apparatus, a heater 150 for raising the atmospheric temperature of the entire apparatus is disposed, and in the present embodiment, the heater 150 is disposed below the transfer belt 7. The rated watt amount of the heater 150 is 30 W. As shown in FIG. 15, while the entire apparatus is connected to a plug receptacle for power supply (Step 1), and when the main body main switch of the image forming apparatus is turned off (Step 2), the heater is operated (Step 3) to raise the temperature of the entire apparatus.

In the first embodiment, in the environment with a temperature of 30° C. and humidity of 80%, after the main body power supply is turned on, the surface layer resistivity is $10^{11}$ Ωcm or less even in the photosensitive drum in the vicinity of the fixing device until the temperature rises, and the desirable reproducibility is slightly deteriorated, but this disadvantage can be eliminated in the present embodiment.

Figure 11:
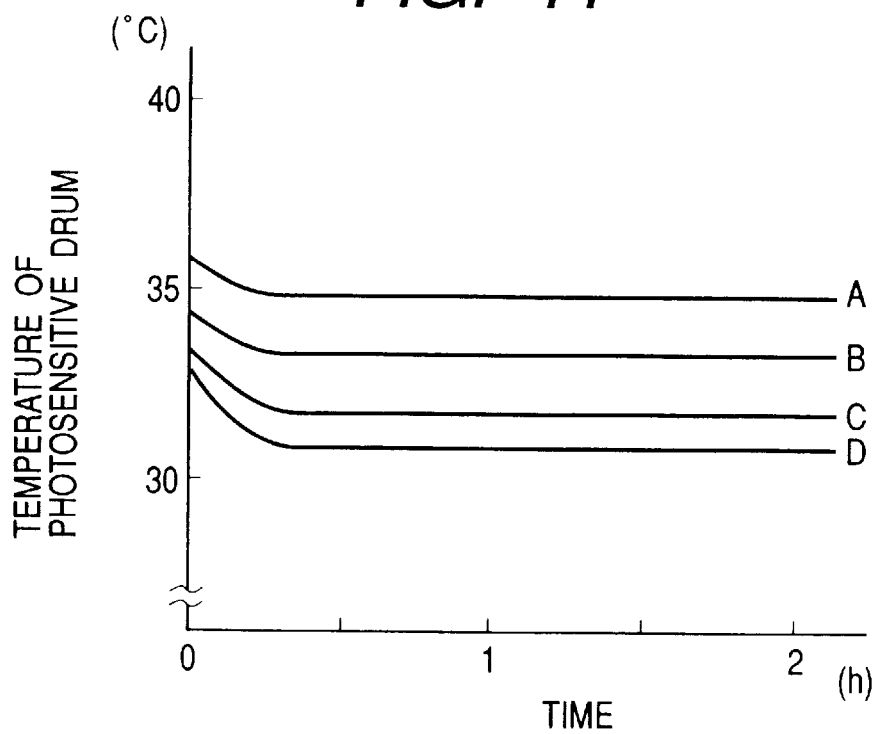
FIG. 11 is a graph showing change in temperature of the photosensitive drum when a heater is used after the power supply of the apparatus main body of FIG. 10 is turned off.

FIG. 11 is a diagram showing the temperature changes of the photosensitive drums when the heater 150 is used after turning off the main body main switch in the 30° C., 80% environment. The meanings of the curve reference numerals A to D are the same as described above. Also in this case, the temperature of the photosensitive drum closest to the fixing device was highest, and 35° C.

Therefore, in the present embodiment, the image forming means such as the photosensitive drum 1*d* closest to the fixing device 6 and charger 3d, that is, the yellow image forming means was used as the image forming means for forming the image pattern for tracking. The image forming means other than the image forming means in the vicinity of the fixing device 6 were used as magenta, cyan, black image forming means.

Third Embodiment

In the first and second embodiments, the toner of the two-component developer was manufactured in the crushing method, but in the present embodiment, a spherical toner with an average particle diameter of 6 μm was manufactured in a suspension polymerizing method, and similarly to the first and second embodiments, $SiO_2$ with an average particle diameter of 50 nm and titanium oxide with an average particle diameter of 20 nm were added to the outside of the toner at each weight ratio of 0.7% and used. For the magnetic carrier of the two-component developer, similarly to the first and second embodiments, a resin polymerizing carrier with a saturation magnetization of 150 emu/cm$^3$ and average particle diameter of 35 μm was used. The mixture ratio of toner and magnetic carrier of the developer is similarly 6:94 in terms of the weight ratio.

Since the toner generated in the polymerizing method has a substantially spherical shape, the toner can uniformly be coated with the external application agent, and the mold releasing ability of the toner is remarkably satisfactory.

For example, when comparing the transfer efficiency (the ratio of the toner amount per unit area transferred to the transfer material with respect to the toner amount per unit area on the photosensitive drum) of the crushed toner with that of the polymerized toner, the crushed toner indicated 90%, and the polymerized toner indicated a higher efficiency of 97%. Therefore, the amount of the toner and external application agent collected to the magnetic brush charger 3 is reduced, and the life can be prolonged under a low humidity environment as compared with the crushed toner.

According to the experiment and research of the present inventors, in the durability test in which 50,000 images with A4 size and image ratio of 6% are formed in an environment with a temperature of 23° C. and relative humidity of 5%, when the resistivity of the charge injection layer is $10^{14}$ Ωcm or less, and preferably $5 \times 10^{12}$ Ωcm, the satisfactory charging can be maintained without any image defect.

In the first to third embodiments, the example has been described in which the present invention is applied to the image forming apparatus for successively transferring the toner images from the respective photosensitive drums to the transfer material (transfer medium) borne and conveyed by the transfer belt, but this is not limited, and the present invention can be applied also to an image forming apparatus in which an intermediate transfer member (transfer medium) is used as described later.

FIG. 12 shows a schematic diagram of the image forming apparatus in which the intermediate transfer member is used. Incidentally, the members provided with functions similar to those of FIG. 1 are denoted with the same reference numerals, and the description thereof is omitted. An image forming process will briefly be described. The respective color toner images formed on the respective photosensitive drums 1a to 1d are successively superposed and electrostatically primarily transferred to an intermediate transfer belt 101 as the intermediate transfer member by the respective transfer charging blades 74a to 74d. Thereafter, the images are collectively and secondarily transferred to the transfer material conveyed in synchronism with the toner image on the intermediate transfer belt by a transfer roller 200 in an electrostatic manner. Subsequently, the toner image on the transfer material is thermally fixed by the fixing device, and discharged to the outside of the machine.

Even in the image forming apparatus shown in FIG. 12, similarly to the first to third embodiments, by forming the tracking image pattern for preventing the forging of the paper money, and the like on the photosensitive drum 1a which is highest in surface temperature, that is, which is closest to the fixing device, the pattern can be reproduced with a high resolution.

Moreover, in the contact charging means of the photosensitive member, not only the magnetic brush charger described in the above-described embodiments, but also a conductive fur brush charger, further a charging roller using conductive rubber or conductive sponge can be used. Furthermore, in the image forming apparatus in which the developing device also serves as a photosensitive drum cleaner, contact charging means can be used in a stationary manner without rotating. Cleaning means may also be disposed before the contact charging means.

Additionally, only the two-component developing method has been described, but other developing methods can also be used. Preferably, a monocomponent contact developing method or a two-component contact developing method for placing the developer in contact with the photosensitive member to perform the development is effective in enhancing the simultaneous collecting ratio of the transfer residual toner during the development. When the polymerized toner is used as the toner in the developer like in the third embodiment, a sufficient collecting effect is obtained, of course, in the monocomponent contact developing method and two-component contact developing method, and also in a monocomponent non-contact developing method, two component noncontact developing method, and other developing methods.

What is claimed is:

1. An image forming apparatus comprising:
   a plurality of image bearing members;
   contact charging means for charging a corresponding image bearing member of said plurality of image bearing members;
   exposure means for exposing a surface of said corresponding image bearing member to form a latent image; and
   developing means for developing the latent image with a toner to form a toner image,
   wherein the toner image formed on each of said plurality of image bearing members is successively transferred to a transfer medium,
   wherein said contact charging means comprises a magnetic brush charger including a magnetic rotary member and magnetic particles retained by a magnetic force of said magnetic rotary member,
   wherein each of said plurality of image bearing members is provided with a surface layer whose volume resistivity is in a range of $10^9$ to $10^{14}$ Ω·cm, and
   wherein a toner image for identifying the apparatus is formed on an image bearing member having a highest temperature among said plurality of image bearing members.

2. The image forming apparatus according to claim 1, wherein said surface comprises a layer formed by resin in which conductive fine particles are dispersed.

3. The image forming apparatus according to claim 2, wherein said conductive fine particles are $SnO_2$.

4. The image forming apparatus according to claim 3, wherein the toner image transferred to the transfer medium is transferred to a transfer material.

5. The image forming apparatus according to claim 1, further comprising a transfer medium bearing member for bearing and conveying the transfer medium, wherein the toner image on each of said plurality of image bearing members is successively transferred to the transfer medium borne by said transfer medium bearing member.

6. The image forming apparatus according to claim 1, wherein said toner image for identifying the apparatus is a yellow toner image.

7. The image forming apparatus according to claim 6, wherein said plurality of image forming means form a yellow toner image, a magenta toner image, a cyan toner image, and a black toner image on said plurality of image bearing members, respectively.

8. The image forming apparatus according to claim 1, wherein said exposure means exposes the surface of said corresponding image bearing member so that said toner image for identifying the apparatus is superposed and formed on the toner image based on original information.

9. An image forming apparatus comprising:

a plurality of image bearing members;

contact charging means for charging a corresponding image bearing member of said plurality of image bearing members;

exposure means for exposing a surface of said corresponding image bearing member to form a latent image;

developing means for developing the latent image with a toner to form a toner image;

a transfer material bearing member for bearing a transfer material; and fixing means for heating and fixing the toner image onto the transfer material after the toner image formed on each of said plurality of image bearing members are successively transferred to the transfer material borne by said transfer material bearing member, wherein said contact charging means is a magnetic brush charger having a magnetic rotary member and magnetic particles retained by a magnetic force of said magnetic rotary member, wherein each of said plurality of image bearing members is provided with a surface layer whose volume resistivity is in a range of $10^9$ to $10^{14}$ $\Omega \cdot$cm, and wherein a toner image for identifying the apparatus is formed on an image bearing member closest to said fixing means among said plurality of image bearing members.

10. The image forming apparatus according to claim 9, wherein said surface comprises a layer formed by resin in which conductive fine particles are dispersed.

11. The image forming apparatus according to claim 10, wherein said conductive fine particles are $SnO_2$.

12. The image forming apparatus according to claim 9, wherein said toner image for identifying the apparatus is a yellow toner image.

13. The image forming apparatus according to claim 12, wherein said plurality of image forming means form a yellow toner image, a magenta toner image, a cyan toner image, and a black toner image on said plurality of image bearing members, respectively.

14. The image forming apparatus according to claim 11, wherein said exposure means exposes the surface of said corresponding image bearing member so that said toner image for identifying the apparatus is superposed and formed on the toner image based on original information.

15. The image forming apparatus according to claim 1 or 9, further comprising heating means for raising an atmospheric temperature in said image forming apparatus.

16. The image forming apparatus according to claim 15, wherein said heating means is operated when a main switch of a main body of said image forming apparatus has been turned off.

17. An image forming apparatus comprising:

a plurality of image bearing members;

contact charging means for charging a corresponding image bearing member of said plurality of image bearing members;

exposure means for exposing a surface of said corresponding image bearing member to form a latent image;

developing means for developing the latent image with a toner to form a toner image;

an intermediate transfer member to which the toner image formed on each of said plurality of image bearing members is successively transferred; and fixing means for heating and fixing the toner image on a transfer material after the toner image on said intermediate transfer member is transferred to the transfer material, wherein said contact charging means is a magnetic brush charger having a magnetic rotary member and magnetic particles retained by a magnetic force of said magnetic rotary member, wherein each of said plurality of image bearing members is provided with a surface layer whose volume resistivity is in a range of $10^9$ to $10^{14}$ $\Omega \cdot$cm, and wherein a toner image for identifying the apparatus is formed on an image bearing member closest to said fixing means among said plurality of image bearing members.

18. The image forming apparatus according to claim 17, wherein said surface comprises a layer formed by resin in which conductive fine particles are dispersed.

19. The image forming apparatus according to claim 18, wherein said conductive fine particles are $SnO_2$.

20. The image forming apparatus according to claim 17, wherein said toner image for identifying the apparatus is a yellow toner image.

21. The image forming apparatus according to claim 20, wherein said plurality of image forming means form a yellow toner image, a magenta toner image, a cyan toner image, and a black toner image on said plurality of image bearing members respectively.

22. The image forming apparatus according to claim 17, wherein said exposure means exposes the surface of said corresponding image bearing member so that said toner image for identifying the apparatus is superposed and formed on the toner image based on original information.

* * * * *

UNITED STATES PATENT AND TRADEMARK OFFICE
CERTIFICATE OF CORRECTION

PATENT NO.     : 6,519,422 B1
DATED          : February 11, 2003
INVENTOR(S)    : Atsushi Takeda et al.

It is certified that error appears in the above-identified patent and that said Letters Patent is hereby corrected as shown below:

Column 3,
Line 5, "o" should read -- of --.

Column 5,
Line 63, "tot he" should read -- to the --.

Column 8,
Line 45, "toner-can" should read -- toner can --.

Column 12,
Line 65, "claim 3," should read -- claim 1, --.

Signed and Sealed this

Fourth Day of November, 2003

JAMES E. ROGAN
*Director of the United States Patent and Trademark Office*